INVENTORS
KARL A. FREY
ELMER C. SIMMONS
BY
Kenway, Jenney & Hildreth
ATTORNEYS

INVENTORS
KARL A. FREY
ELMER C. SIMMONS
BY
Kenway, Jenney & Hildreth
ATTORNEYS

INVENTORS
KARL A. FREY
ELMER C. SIMMONS
BY
Kenway, Jenney & Hildreth
ATTORNEYS

INVENTORS
KARL A. FREY
ELMER C. SIMMONS
BY Kenway, Jenney & Hildreth
ATTORNEYS

INVENTORS
KARL A. FREY
ELMER C. SIMMONS
BY Kenway, Jenney & Hildreth
ATTORNEYS

INVENTORS
KARL A. FREY
ELMER C. SIMMONS
BY Kenway, Jenney & Hildreth
ATTORNEYS

United States Patent Office 3,449,734
Patented June 10, 1969

3,449,734

POSITIONING APPARATUS FOR A RANDOM ACCESS STORAGE DEVICE USING A DUAL-FREQUENCY REFERENCE TRACK

Karl A. Frey, Boston, and Elmer C. Simmons, Whitman, Mass., assignors, by mesne assignments, to Mohawk Data Sciences Corporation, East Herkimer, N.Y., a corporation of New York Filed Apr. 28, 1965, Ser. No. 451,424
Int. Cl. G11b *5/00*
U.S. Cl. 340—174.1 12 Claims

ABSTRACT OF THE DISCLOSURE

A random access digital storage device includes a plurality of stacked magnetic disks arranged to cooperate with a plurality of tandem-connected accessing arms, each of the latter supporting a read-write head. The arms are selectively movable in unison under the control of a primary positioner whereby the heads are positioned over desired data tracks on each of the disk surfaces. A dual-frequency reference track on one of the disk surfaces permits periodic precise realignment of each head with its respective data tracks. This is done by a vernier positioning means which, after the primary positioner has placed the heads into rough registration with the reference track, adjusts the heads with respect to the primary positioner until the head associated with the reference track is precisely centered thereon. This latter condition is determined by a circuit which detects a change in the regularity of the waveform generated in the read head by the dual frequencies of the reference track.

Our invention relates to positioning apparatus, and particularly to a novel method and means for positioning one element relative to another with a high degree of accuracy.

The requirements of users of data processing apparatus have created a demand for random access memory systems of the kind in which data is recorded magnetically on a set of magnetic recording disks arranged to rotate with respect to recording and reproducing transducer heads. Data is entered on such disks on assigned recording tracks, each at a different radius on the disk. Digital positioning apparatus is commonly provided for setting arms carrying transducer heads to locations above the surfaces of the disks corresponding to the desired set of recording tracks. It is apparent that if the tracks are not recorded concentrically, or if a recording head is not reset exactly to the track location at which the desired data was entered, false reproduction will occur. The apparatus required for positioning a set of heads with respect to the set of disks to the required accuracy is necessarily made with great precision, and is inherently somewhat complex. Accordingly, it would be highly desirable to provide removable sets of recording disks which would be used interchangeably on a single basic data exchange unit, the latter comprising apparatus for rotating the disks, positioning a set of heads with respect to the disks, and exchanging information with the disks. Removable disk sets are also desirably available for use in recording data at one location and then reproducing it at another, using different data exchange units. The manufacture of random access disk files with removable disk sets is obviously complicated by the necessity for a particular track address location on one set of disks to correspond to the same location on another set, so that each can be used on any data exchange unit. It is a specific object of our invention to facilitate the manufacture of random access disk files with interchangeable disk sets.

To achieve the objects of our invention, we record on a magnetic recording disk, such as those used in a random access disk file, a pair of adjacent and closely spaced registration signals, one signal, being of a first constant frequency, and a second signal of a second constant frequency slightly different from the first frequency. A transducer head is then positioned by any conventional method to approximately the vicinity of the recorded tracks, and the disk is rotated. The signal reproduced by the head is then recorded, amplified and hard limited. By observing the recorded signal on an oscilloscope, or by novel apparatus of our invention to be described, the head is slowly moved until the hard limited output signal exhibits a change in frequency. We have discovered that this change in frequency occurs over a very small region between the two registration signals. Any lack of concentricity in the recorded tracks is immediately noticeable, and can be corrected by conventional manufacturing techniques, so that it is possible to produce disks with recorded tracks each having a constant radius with respect to the axis of rotation of the disks. The position of the head when registered exactly between the registration signals may be taken as establishing the center of a registration track. By apparatus known per se, once the datum position has been established, it is possible to establish a set of data track locations on one or both sides of the registration track with great accuracy.

In applying our invention to the manufacture of a random access disk file, provided with a conventional digital positioning linkage for setting arms carrying transducer heads to one of a set of data exchange positions, we provide a vernier adjustment in the positioner linkage, and a servomechanism, including a servomotor, to control the vernier adjustment. We have found that conventional digital positioning apparatus, when once adjusted into exact relation with a registration track recorded as described above, will position accurately with respect to the remaining tracks. The apparatus of our invention serves to register the arms with one of a set of tracks recorded on a disk, whereupon the digital positioning apparatus can thereafter set the arms to any of the other tracks.

To control the servomotor, we provide apparatus that can be connected to a selected head adjacent the registration signals on a selected surface of one of the disks, for amplifying and limiting the signals received from the head when it has been set approximately to the registration track by the digital positioning apparatus. Apparatus is provided for detecting the change in frequency described above, and apparatus is provided for controlling the servomotor to adjust the recording heads until this point is detected. Since the head may initially be on either side of the registration track, means are provided for driving the servomotor to an extreme position in one direction, when the head will always be on one side of the registration track, before the search for the center of the track is begun by movement of the servomotor in the opposite sense. This arrangement has the further advantage that any backlash in the system is always in the same direction during registration.

Our invention will best be understood in connection with the following detailed description, and the accompanying drawings, of a preferred embodiment thereof.

Figure 1:
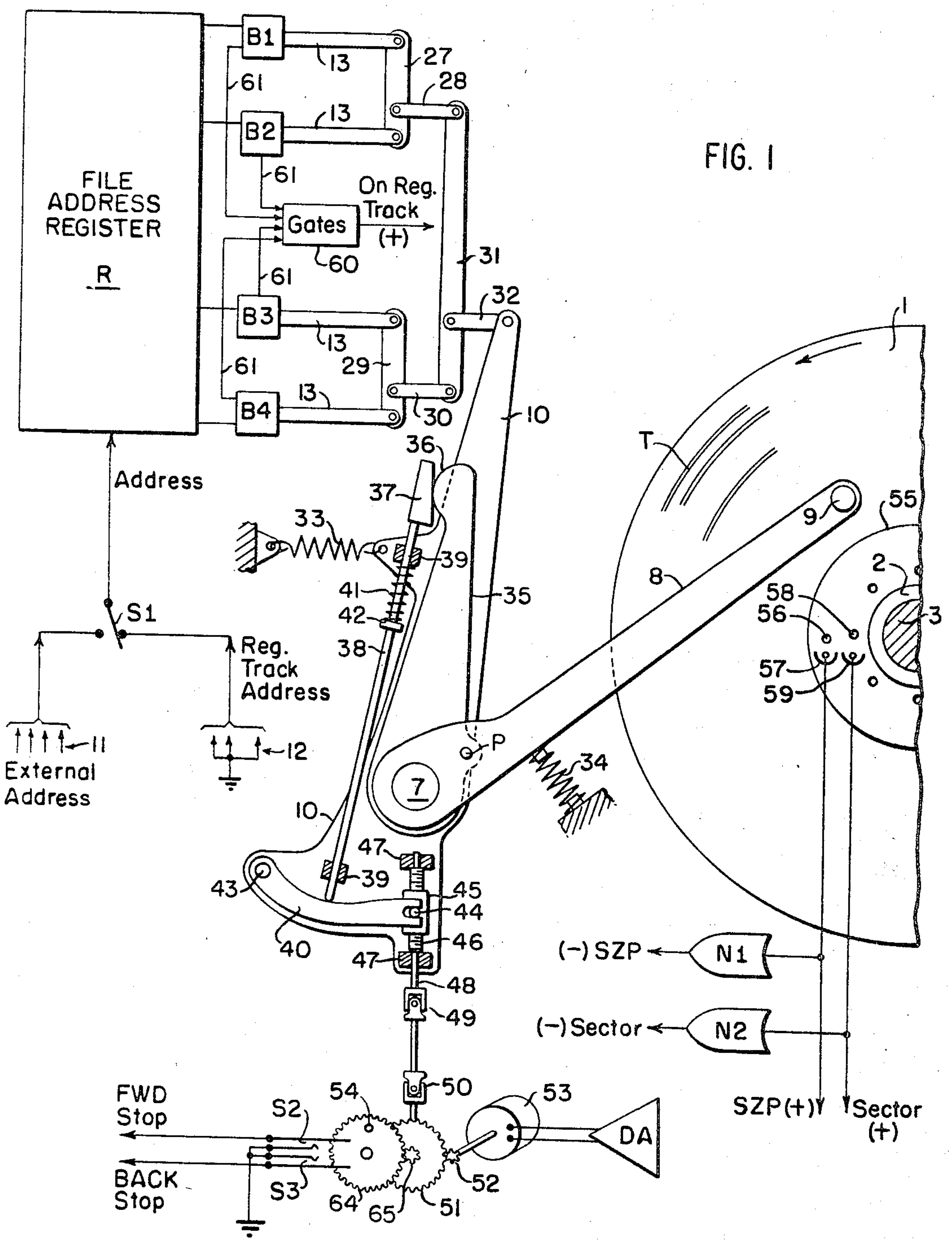
FIG. 1 is a schematic mechanical and wiring diagram of a portion of a random access disk file equipped with the positioning apparatus of our invention.
Figure 2:
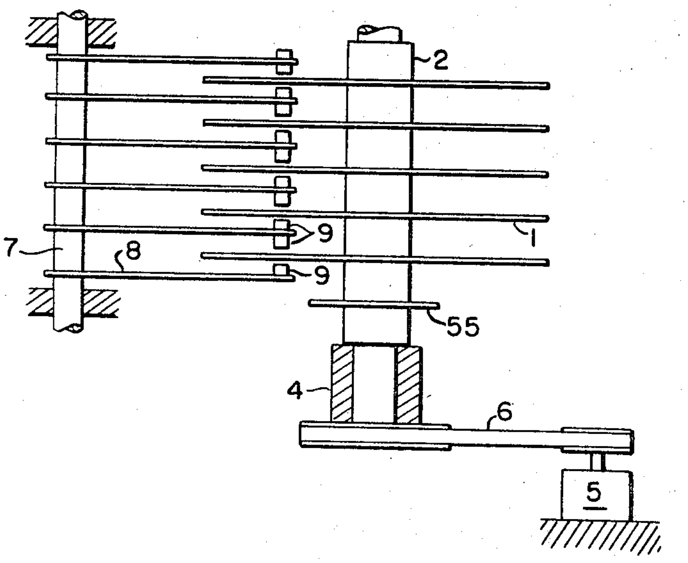
FIG. 2 is a schematic plan view of a portion of the random access disk file of FIG. 1.

Referring now to FIGS. 1 and 2, we have illustrated schematically pertinent portions of a random access disk file of the type in which a set of disks 1, having ferromagnetic recording surfaces, are fixed on a hub 2. The hub 2 is removably mounted on a mandrel 3. The mandrel 3 is provided with suitable bearings, as indicated at 4, and is arranged to be driven by a motor 5 through a belt 6. Rotatably mounted on a shaft 7 journalled in the frame of the data exchange unit are a plurality of arms 8 carrying recording and reproducing transducer heads 9 for exchanging data with the surfaces of the disks 1. Such a disk file, with removable sets of disks, is currently marketed as the ANelex Model 80 Random Access Disk File. At any particular position of the arms 8, one of the heads 9 may be selected, by conventional electronic switching apparatus, not shown, to either record or reproduce data on a selected track T on a selected disk 1. Normally, a large number of track positions would be provided; for example, one hundred per disk surface. For simplicity of illustration, however, we have illustrated positioning apparatus for providing only sixteen positions, it being understood that additional positions could be provided for by an obvious extension of the apparatus shown.

As schematically illustrated, the positioning apparatus for directing the heads to a particular track location comprises a set of binary positioning units B1, B2, B3 and B4, connected through binary accumulating linkage to a positioning arm 10. The binary positioning units B1 through B4 are controlled by an address stored in a conventional file address register R, to assume a position corresponding to the requested track address. Additional electronic switching apparatus, not shown, is provided to select the desired arm 8, head 9, and desired unit record location.

The file address register R, comprising a set of flip-flops, magnetic cores, or the like, is adapted to be supplied either with an external address from a computer or other data processing device making use of the file, or with a built-in registration track address. The external address may be supplied over a group of leads 11, under the control of electronic switching means, schematically indicated as a switch S1, in a first position, or by the built-in address provided by grounds to selected leads 12, defining the registration track address code, with the switch S1 in its other position. For the apparatus shown, four leads would be provided for the address, and the selected registration track would be 1101 with the illustrated connection of the leads 12, using the convention that ground potential represents logic 1 and an open potential or a negative potential represents logic 0. Note that for convenience, only one address lead and one armature for the switch S1, have been shown, but these should be deemed to represent the number required for the desired address code.

Figure 3:
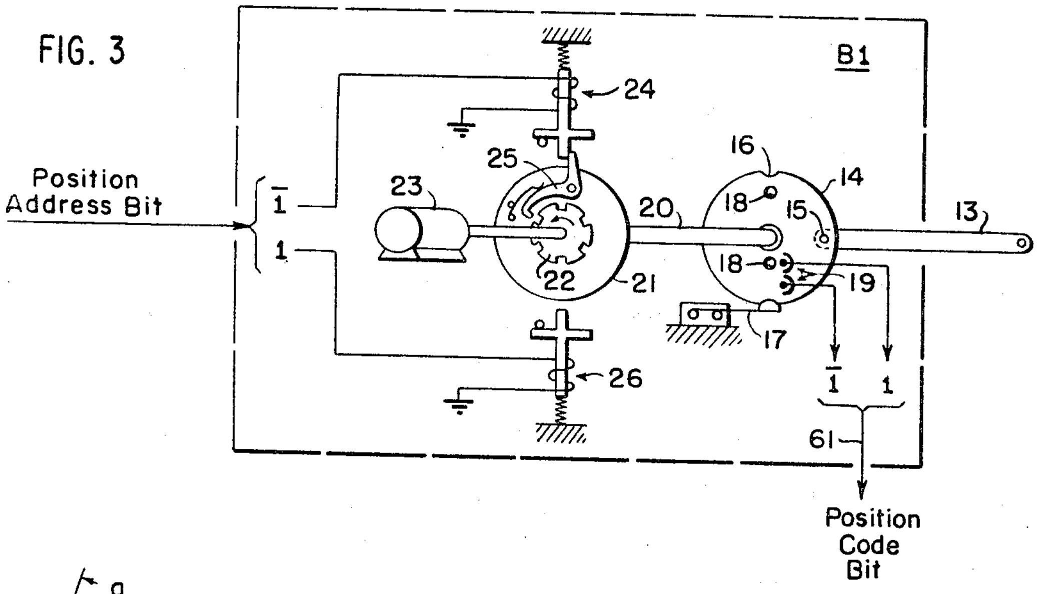
FIG. 3 is a schematic diagram of a binary positioner forming part of the apparatus of FIG. 1.

The binary positioning units B1 through B4 may each be of the same construction, preferably that shown schematically in FIG. 3 for the unit B1. Referring to FIG. 3, each of the binary positioning units comprises a two-position cam 14 eccentrically and rotatably connected to an output link 13 as indicated at 15. The cam 14 is provided with two diametrically opposed notches 16 for alternate engagement by a spring-loaded detent 17. A pair of apertures 18 are provided in the disk 14, diametrically opposed but at different radial distances from the center of the cam 14, such that in each of the two detented positions of the cam 14 a different one of two photocells 19 is illuminated by a lamp, not shown, on the other side of the cam. These photocells are connected in a conventional manner, not illustrated in detail, to provide a position code bit, both the position bit and its complement being provided. The cam 14 is connected, as by a shaft 20, to a half-revolution clutch, here schematically shown as comprising a disk 21 connected to the shaft 20, and adapted to be drivably connected to a constantly rotating ratchet 22 driven by a conventional motor 23. In the position of the apparatus shown, this driving connection may be made to drive the cam 14 through 180 degrees to its second position by energizing a solenoid 24, to release a spring biased pawl 25 mounted on the disk 21 into engagement with the teeth of the ratchet 22. The disk will then be driven until the pawl 25 strikes the extension on the armature of a second solenoid 26. Movement back to the original position may be accomplished by energizing the solenoid 26 to release the pawl.

Referring again to FIG. 1, the output shaft 13 of the positioning unit B1 is pivotally connected at one end to a link 27, the link 27 being pivotally connected at its other end to the output shaft 13 of the positioner unit B2. A drive link 28 is pivotally connected to the link 27 two-thirds of the distance from the connection of the link 13 of the positioner B1 to the connection of the other link 13. In this manner, the stroke of the positioner unit B1 will move the link 28 one-half as far as will corresponding movement of the positioner B2. The output shafts of the units B3 and B4 are similarly connected to a link 29, driving a link 30 connected two-thirds of the distance from the shaft 13 of the unit B3 so that a unit movement provided by the positioner B3 prodcued one-half of the displacement of the link 30 as a similar displacement by the positioner unit B4. The links 28 and 30 are in turn connected to the ends of a link 31, having one end of an output link 32 connected thereto at a distance twice as far from the connection to the link 28 as the connection to the link 30. The link 32 is accordingly capable of movement to any one of 16 different positions selected by the combination of positions of units B1 through B4 directed by the address stored in the file address register R.

The link 32 is connected at one end to an end of the drive arm 10. The arm 10 is connected resiliently to the frame of the machine by a tension spring 33, urging the arm 10 to the left, or counter-clockwise in FIG. 1, against the positioner linkage. The arms 8 are urged counterclockwise in FIG. 1, by suitable means schematically indicated as a compression spring 34 connected between the arms 8 and the frame of the machine. For reasons unnecessary to an understanding of our invention, the actual linkage used in a commercial form of the disk file between the arm 10 and the arms 8 is more complex than that here shown, though performing the function illustrated. In particular, apparratus is provided in the linkgae for permitting the arms 8 to be swung free of the disks 1 beyond the travel of the positioner linkage. Since the details of this apparatus form no part of our invention, it has been schematically shown as a removable pin P connecting the arms 8 to an arm 35, such that the arms 8 and 35 are locked together with the pin in place. The arm 35 terminates in a rounded bearing surface 36 engaging an adjustable positioning wedge 37 mounted on a rod 38 slidable in bearings 39 mounted on the arm 10. The rod 38 is urged downwardly into engagement with a crank arm 40 by a compression spring 41 extending between the upper bearing 39 and a flange 42 on the rod 38. The arm 40 is pivotally mounted to the arm 10 as indicated at 43, and is forked at its other end to receive a driving pin 44 mounted on a travelling nut 45 threaded onto a rotatable lead screw 46. The lead screw 46 is journalled in bearings 47 on the arm 10, and is connected at one end to a drive shaft 48 connected through a pair of universal joints 49 and 50 to a drive gear 51. At least one of the universal joints 50 should be provided with lost motion for adjustment of the distance between the gear 51 and the arm 10 as the arm is rotated about the shaft 7. The gear 51 is arranged to be driven by a smaller gear 52 mounted on the output shaft of a servomotor 53 of any conventional design. The servomotor 53 is controlled by drive amplifiers DA, in a manner to appear in more detail below.

Limit switches are desirably provided for limiting the travel of the motor 53. For this purpose, a forward stop switch S2 and a back stop switch S3 are mounted in a suitable location, here shown as adjacent the periphery of a gear 51, and are each arranged to be actuated by suitable means such as an arm 54 on the gear 64 driven by the gear 51 through a reducing gear 65 fixed to the gear 51 such that the forward stop switch S2 will be closed by the arm 54 rotated counterclockwise a desired distance, and the back stop switch S3 will be closed when the motor is rotated in the opposite direction over a desired angle encompassing a maximum range of travel desired for the adjusting assembly. Mechanical stops, not shown, are preferably provided to be engaged after each switch is closed, so that the apparatus is made physically incapable of an adjustment of the wedge 37 that might drive the arms 8 into engagement with the hub of the disk assembly. In connection with the limit switches S2 and S3, and other switches to be described, it should be noted that the terms "forward" and "back" or "backward" are relative, adopted merely for mnemonic convenience, as either sense of rotation may be considered forward. However, the sense termed "backward" here is preferably away from the hub 2, as the motor is more often rotated to the extreme "backward" position.

Mounted on the hub 2 of the disk set is a sector code disk 55, bearing radially displaced perforations to locate a reference starting position on each recording track, and to locate the beginning of each sector on each track. For this purpose, the disk is provided with one aperture 56 at a radius to illuminate a photocell 57, by means of a lamp behind the disk, not shown, once per revolution of the disks 1, to provide a pulse labeled SZP(+). By means of a conventional NOR gate N1, used here as an inverter, a pulse minus (−)SZP is also produced. The convention used here, and throughout the drawings, is that when the labeled signal is present on the lead, the lead is at the polarity shown adjacent the symbol identifying the signal. The NOR gate N1, as well as other similarly designated gates in the drawings, may be of a type well known in the art which produces a current sink at ground potential at its output terminal when and only when all of its input terminals are either open or are connected to a negative potential. The label (+) thus refers to ground potential, and (−) to either an open circuit or a negative potential.

A second row of holes 58 is provided in the disk 55 at a different radius to illuminate a photocell 59 eight times per revolution of the disk. Only one of these eight pulses is used in the operation of the equipment to be described, the other pulses being used in other portions of the data exchange apparatus, not shown. As indicated, this photocell 59 produces a pulse "sector (+)" eight times per revolution of the disks 1, and a NOR gate N2, used as an inverter, produces a pulse "(−) sector" at these times. The apertures 58 slightly lag the aperture 56 such that the "sector" pulses lag and overlap the "sector zero" pulses, for purposes to appear.

Figure 4:
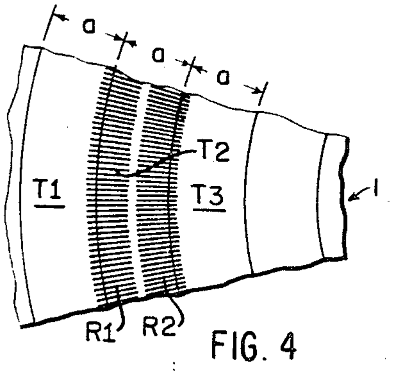
FIG. 4 is a schematic sketch of a portion of a disk surface of the apparatus of FIGS. 1 and 2, indicating the mode of recording of the registration signals.
Figure 6:
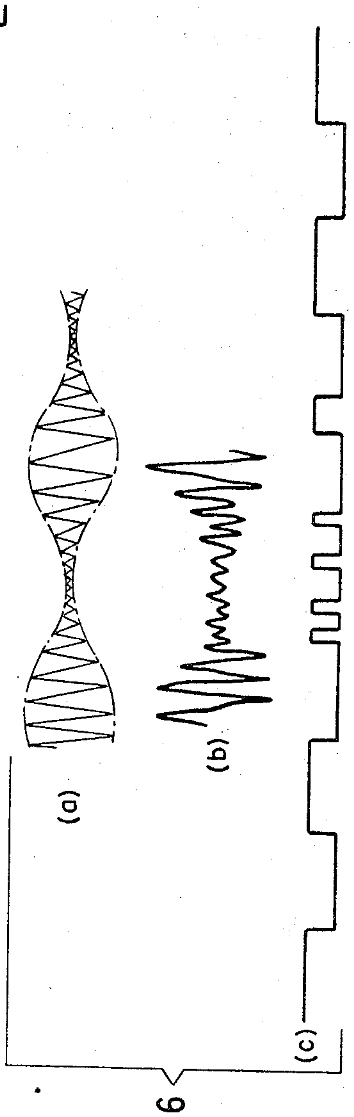
FIG. 6 is a set of diagrams of waveforms occurring during the operation of the apparatus of FIGS. 1–5.

Referring now to FIG. 4, we have shown, on an enlarged scale and quite schematically, a section on the surface of one of the disks, indicating graphically the widths of recording tracks T1, T2 and T3. The width *a* of each of these tracks is, in accordance with present practice, approximately 0.020 inch. This width is the physical space provided on the record medium; in practice, tracks are within 0.010 inch wide and are erased over a width of 0.018 inch within the space of 0.020 inch provided. At any selected one of these tracks T2, which in the embodiment illustrated would have the track address 1101, a registration track is established by recording on either side of the track T2 signals R1 and R2 of slightly different frequency. For example, in a practical embodiment of our invention one of the signals R1 and R2 were recorded as an alternating series of flux transitions at 400 kilocycles per second, and the second signal was recorded with a center about 0.014 inch from the center of the first signal with a similar signal at 410 kilocycles per second. With a recording head positioned exactly on track T2, in other words such that it would best reproduce a signal recorded exactly on track T2, the head will receive equal components from the recorded signals R1 and R2, and these will essentially add algebraically upon reproduction to produce a waveform essentially as shown in FIG. 6*a*, with the envelope oscillating at the beat frequency equal to the difference in frequency of the two recorded signals. If the two signals were recorded and reproduced as pure sine waves, an exact null would occur at the beat frequency. However, when a reproduced signal is considerably enlarged and examined, it will appear more as shown in FIG. 6*b*, with reasonably regular crossings of the zero axis where the recording head is not exactly between the two recorded signals, and with considerable noise and irregularity developing in the vicinity of the null. If the reproduced signal is amplified and hard limited, as indicated at FIG. 6*c*, there will result a train of square waves of regular duration and frequency except in the null regions, where there will be produced a series of sharp spikes of irregular distribution. The reason for this behavior is thought to be that the harmonics of the two recorded signals do not null at the same points, so that it is essentially combinations of these harmonics that are seen at the nulls. The region over which the null is obtained is extremely small, and with the values given above, would be less than 0.001 inch. In accordance with our invention, the arms 8 are first located approximately at the registration track address, and the arms are then moved slowly until the presence of the short spikes indicated in FIG. 6*c* is detected. Control apparatus for accomplishing this purpose automatically, in conjunction with the apparatus described in connection with FIGS. 1 and 2, will next be described.

Figure 5:
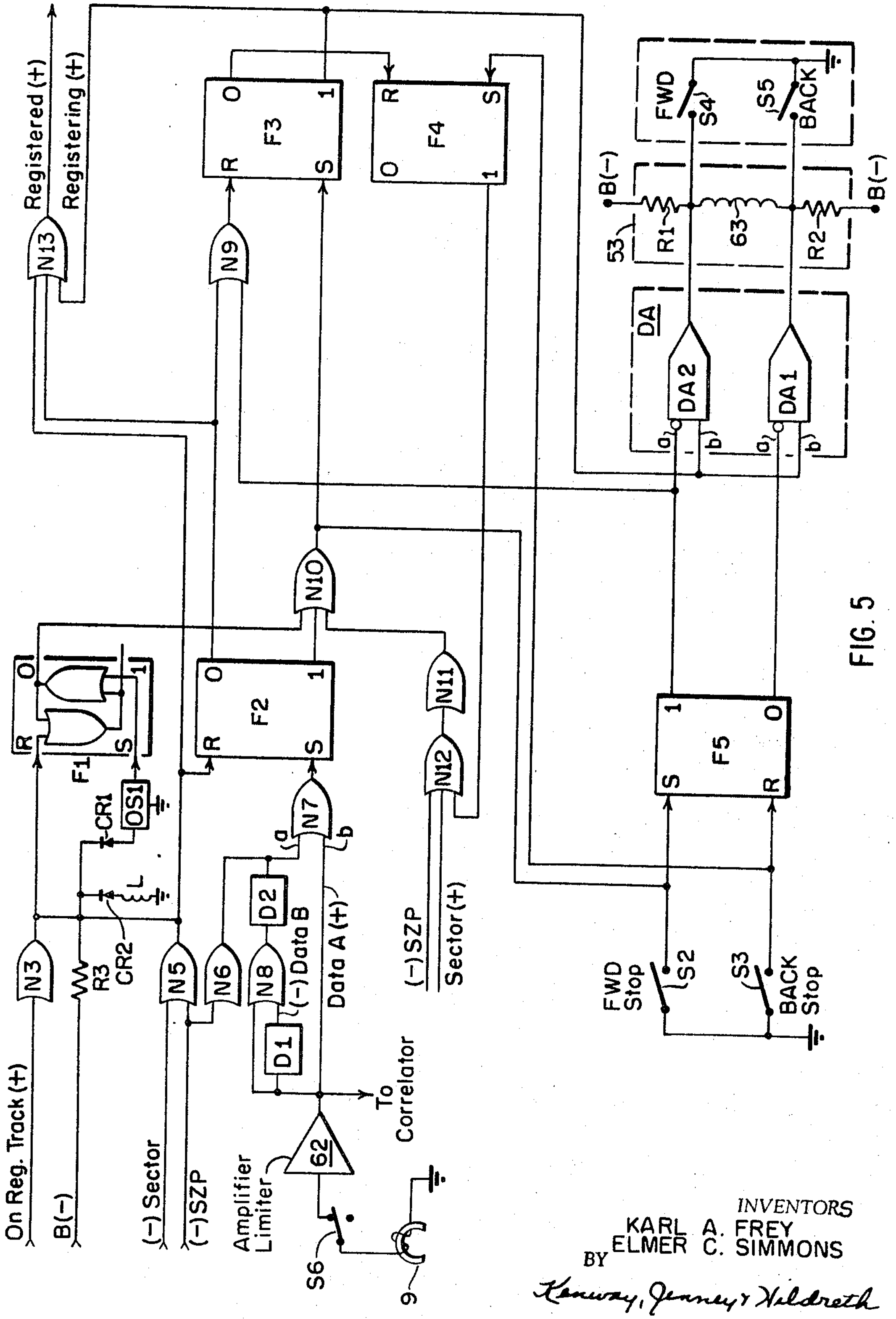
FIG. 5 is a schematic wiring diagram of control apparatus for the positioning apparatus of FIGS. 1 and 2.

Referring now to FIG. 5, in conjunction with FIGS. 1 and 2, we have shown a schematic wiring diagram of control apparatus for bringing the arms 8 into exact registration with the registration track once the positioning apparatus controlling the arm 10 has brought the arms 8 into approximate registration with the registration track with the switch S1 in the position shown in FIG. 1 and the registration track address applied to the file address register R. Five basic signals control the apparatus of FIG. 5. Reading from the top of FIG. 7, and comparing with FIG. 1, the first is "on registration track (+)," produced by a conventional set of gates 60 in FIG. 1, when the position code bits provided by the cables 61 in FIGS. 1 and 3 correspond to the registration track address set in by the grounded leads 12. Next are the sector zero pulse (−)SZP, and the sector pulses "sector (+)" and "(−) sector," produced in the manner described above in connection with FIG. 1. Finally, a selected one of the heads 9 adapted to cooperate with the recorded registration signals is connected over conventional switching apparatus for selecting a head, here shown as a switch S6, to reproduce the data from the head 9 that it receives from the pair of recorded signals adjacent the registration track. The apparatus of FIG. 5 consists of an amplifier-limiter 62, a set of NOR gates N3 through N13, a set of flip-flops F1 through F5, a pair of delay lines D1 and D2, the driver amplifiers DA, and the motor 53. The amplifier-limiter 62 may be any conventional apparatus for amplifying and hard limiting the flux transitions received by the head 9. This amplifier 62 may comprise the conventional read amplifier used to supply information to the data correlator for reproducing data in the desired form corresponding to the information recorded on a selected track. Such a correlator is shown and described, for example, in U.S. application for Letters Patent Ser. No. 402,499, now Patent No. 3,377,583, filed on Oct. 8, 1964 by John Clark Sims, Jr., for Variable Density Information Recording and Reproducing System, and assigned to the assignee of our application.

The NOR gates N3 through N13 can be of any conventional design, but as here shown are assumed to be of the type adapted to produce an open circuit level when a ground level signal is applied to any of their input terminals, and to produce a ground level output signal when a negative input signal or null input signal is applied to all of the input terminals. Such gates are shown and described in U.S. application for Letters Patent Ser. No. 358,853, now Patent No. 3,377,620, filed Apr. 10, 1964 by John C. Sims, Jr., for Variable Word Length Internally Programmed Information Processing System and assigned to the assignee of our application.

As indicated for the flip-flop F1, the flip-flops shown may each comprise a pair of NOR gates connected in back-to-back relationship. Thus, a ground level input applied to the reset terminal R of any of the flip-flops will cause its 0 output terminal to go to ground, and its 1 output terminal to produce an open circuit condition. The opposite state is produced by ground level applied to the set input terminal S of the flip-flop, causing the 1 output terminal to go to ground and the 0 output terminal to open.

The delay lines may be of any conventional design for producing an output inverted in phase with respect to the input a predetermined time after the input level changes. The driver amplifiers DA, comprising a pair of drive amplifiers DA1 and DA2, may each consist of a power transistor connected as a switch, with control transistors at the input connected such that a ground level applied to the input terminal *a* of either of the amplifiers DA1 and DA2 will prevent conduction of the output transistor, presenting an open circuit at the output, whereas a ground level input applied to the terminal *b* will cause the output transistor to conduct at ground potential. Small circles at the input terminals *a* indicate that these leads inhibit the operation of the associated amplifier when at ground potential, with the other input terminals causing operation when a ground potential and when the inhibit terminals are not energized.

The motor 53 may be of any conventional reversible design, provided with a drive winding 63 connected at one end through a resistor R1 to a suitable source of negative potential, and connected at the other end through a similar resistor R2 to the same negative potential. It will be apparent that if one of the amplifiers DA1 and DA2 presents a current sink at ground level, current will flow through the coil 63 towards that sink, causing the motor to operate in one direction. If the opposite motor terminal is grounded, operation in the opposite direction will take place. A manually operable forward control switch S4 and a manually operable back control switch S5 are provided, each of which may be closed when desired to operate the motor manually. Manual operation may be necessary, for example, when it is desired to initially record the registration track signals. An indicator dial, not shown, may be mounted on the gear 64 in FIG. 1, to facilitate manual operation by the switches S4 and S5 if desired.

The flip-flops F1 and F2 are arranged to be reset by a ground level potential appearing at the output terminal of either of the NOR gates N3 and N5. The gate N3 will produce an output ground potential when the selected head 9 is not in the vicinity of the registration track, the signal "on registration track (+)" not being present at this time. The gate N5 will produce an output ground potential when and only when both the "sector" pulse and the "sector zero" pulse are present. This condition occurs once during each revolution of the disks 1.

The output terminals of the gases N3 and N5 are connected to a pulse-forming network comprising two diodes CR1 and CR2, a resistor R3, and an inductor L. As shown, one terminal of the resistor R3 is connected to a suitable source of negative potential B(−), and the other terminal is connected through the diode CR2 to one terminal of the inductor L. The second terminal of the inductor is grounded. The junction of the resistor R3 and the diode CR2 is connected to the output terminals of the gates N3 and N5, and through the diode CR1 to the input terminal of a conventional one-shot multivibrator OS1. The multivibrator OS1 may be of any conventional construction capable of producing a ground level output pulse of fixed duration, above a normally negative potential, in response to a negative-going trigger transition applied to its input terminal. By this arrangement, when the gate N5 produces an output pulse at ground potential, the junction of the resistor R3 and the diode CR2 is brought to ground potential. When the pulse is removed, the junction swings sharply negative and a negative-going transition is applied to the one-shot OS1, producing a ground level output pulse to set the flip-flop F1.

The flip-flop F2 may be set when an output ground potential is produced by a NOR gate N7. The gate N7 has a first input terminal *a* to which are connected the output terminals of a NOR gate N6, used as an inverter, and a delay line D2. The NOR gate N6 produces a ground output potential, disabling the gate N7, during the "sector zero" pulse. The reason for disabling the gate N7 during the "sector zero" pulse is that the start and end of writing the registration track may conveniently be caused to occur during this pulse, and in general there will be a transient in the signal read back where the end of the recorded track meets the beginning. This transient could be located anywhere on the track, but wherever it is located, a pulse bridging it should be provided to disable the gate N7 when it appears. The gate N7 is provided with a second input terminal *b* connected to receive the hard-limited output signal from the amplifier 62. The gate N7 may thus set the flip-flop F2 when and only when both the output of the amplifier 62 and the output of the delay line D2 are below ground potential. The input of the delay line D2 is derived from the output of the amplifier 62, in a manner next to be described, such that the flip-flop F2 will be set only when the selected head 9 is exactly on the registration track.

The output of the amplifier 62 is supplied to the first conventional inverting delay line D1, to produce a signal "(−) data B." This signal is delayed from the "data A" signal by an amount less than one-half period of the "data A" signal pulses produced with the head 9 out of register but near the registration track and providing a convenient sampling time. For example, if the registration track signals are recorded at 400 and 410 kilocycles per second, respectively, the delay line D1 could be arranged to produce a three-tenths microsecond delay. This delayed output signal is applied together with the output of the amplifier 62 to a NOR gate N8 to produce an output ground level at the input of the delay line D2 at times when the "(−) data B" level is present and the "data A (+)" level is absent. This level is delayed by the delay line D2 by an amount sufficient to apply a negative pulse at the input terminal A of the gate N7 toward the middle or latter portion of the next following "data A (+)" pulse produced when the head 9 is not exactly on the registration track. When the head 9 is exactly on the registration track, a series of brief irregular pulses will be periodically produced, as indicated in FIG. 6*c*, in bursts occurring at the beat frequecny rate, and the negative pulse produced by the delay line D2 will occur at a time when the "data A (+)" pulse is absent. This will cause the flip-flop F2 to be set to indicate that the arms 8 are on track.

The flip-flops F3 and F5 are arranged to be set by an NOR gate N10, when its output potential is at ground potential. The gate N10 has a first input terminal connected to the 0 output terminal of the flip-flop F1, a second input terminal connected to the 1 output terminal of the flip-flop F2, and a third input terminal connected to the output terminal of an NOR gate N11. The NOR gate N11 serves to invert the ouput of an NOR gate N12. The NOR gate N12 has three input terminals. One is connected to the 1 output terminal of the flip-flop F4, a second is connected to receive the "sector (+)" pulse, and a third is connected to receive the "sector zero" pulse (−)SZP. The gate N12 will thus produce an output ground potential during the "sector zero" pulse before the "sector" pulse arrives if the flip-flop F4 is in its reset state. When this occurs, the gate N11 will produce an open at its output terminal, enabling the gate N10 to produce an output ground terminal, setting the flip-flops F3 and F5 if the flip-flop F1 is in its set state and the flip-flop F2 is in its reset state.

The flip-flop F3 has its reset input terminal R connected to the output terminal of an NOR gate N9. This gate has a first input terminal connected to the 0 output terminal of the flip-flop F2, and a second input terminal connected to the 1 output terminal of the flip-flop F5. The gate N9 will thus operate to reset the flip-flop F3 when the flip-flop F2 is in its set state and the flip-flop F5 is in its reset state.

The 0 output terminal of the flip-flop F3 is connected to the reset terminal of the flip-flop F4. The flip-flop F4 will thus be reset when the flip-flop F3 is reset. The flip-flop F4 is set by closure of the back stop switch S3, closed when the motor 53 has rotated its maximum angle in the reverse direction.

The flip-flop F5 is set by the gate N10 in the manner described above, and may also be set by closure of the forward stop switch S2 in case the motor rotates through its maximum angle in the forward direction. As will appear, this would not normally occur during operation, and the switch S2 is provided as a safety precaution to prevent overdriving the vernier adjustment, as during manual operation of the motor. The flip-flop F5 is reset by closure of the back stop switch S3, and, as will appear, this action will normally occur during the registration procedure. The flip-flop F5 serves as a directional control for the motor 53. In its set state, operation in the forward direction is inhibited by applying ground to the input terminal *a* of the direction control amplifier DA2, permitting backward operation by removing the ground potential from the input terminal *a* of the amplifier DA1. In its opposite state, it inhibits backward operation of the motor 53, and permits forward operation by removing the ground potential from the amplifier DA2. Depending on the state of the flip-flop F5, the motor will be rotated in one direction or the other when the flip-flop is in its set or reset state.

Depending on the nature of the other apparatus used for normal data transfer, various control and indication signals may be taken from the circuit of FIG. 5 for system sequencing purposes. For example, as shown, a NOR gate N13 may be provided with three input terminals connected to the reset line for the flip-flops F1 and F2, the 0 output terminal of the flip-flop F2, and the 1 output terminal of the flip-flop F3. As will appear, these input terminals will be at a negative potential when registration has been detected and the arms 8 are exactly on track.

Figure 7:
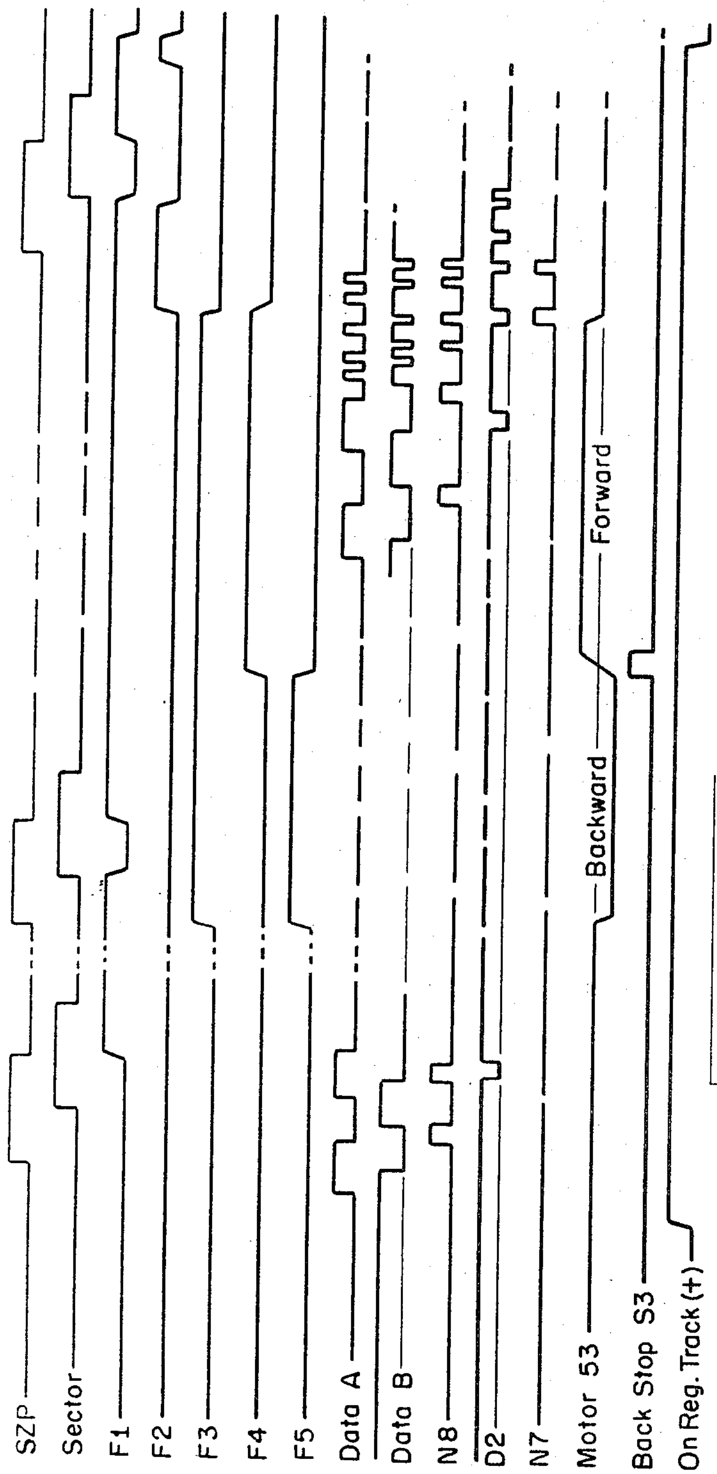
FIG. 7 is a timing diagram illustrating the operation of the apparatus of FIGS. 1–5.

Having described the structure of the preferred embodiment of our invention, its operation under typical conditions will next be described with reference to FIGS. 1, 5 and 7. Assume that the switch S1 is in the "external address" position in FIG. 1, and that the external address lines are disabled. Further, assume that a set of disks 1 has been placed on the mandrel 3, the arms 8 being swung out of the way for this purpose, and that one of these disks has been prerecorded with a pair of adjacent signals defining the registration track by the radius on the disk equidistant from their centers. Assume that the electronic switching means S6 has been actuated to connect the selected head 9 to the input of the amplifier 62. Next, assume that the switch S1 is moved to the position shown in FIG. 1, such that the registration track address is supplied to the file address register R. The positioner units B1 through B4 will then function to move the arms 8 to the nominal registration track address location. All of the flip-flops in FIG. 6 will be in their reset states, and the motor 53 will be stopped. When the arms 8 reach the nominal registration track address, ground potential will be applied to the input terminal of the gate N3, and one of two things may occur. First, if the arms 8 happen to land exactly on track, the amplifier 62 will produce an irregular series of pulses, and the gate N7 will be enabled to set the flip-flop F2. As soon as this occurs, the NOR gate 13 will produce the level "registered (+)," and this level may be used to actaute an indicator, signifying that the switch S1 may be returned to its external address position. If desired, this operation may be caused to occur automatically, by conventional swtiching techniques known in the art. However, if the arms are not in exact registry, regular pulses will be produced by the amplifier limiter 62, the flip-flop F2 will not be set, and nothing further will occur until the "sector zero" pulse is produced. This may occur as soon as the apparatus is nominally on the registration track, or at any time up to one revolution later. Referring to FIG. 7, we have graphically illustrated the occurrence of the "sector zero" pulse and the "sector" pulse, without any particular reference to polarity. The states of the flip-flops F1 through F5 are shown as reset when the heavy line is on the base line, and set when it is above the base line. The "data A" and "data B" pulses have been illustrated as being of opposite phase, not in any particular phase relation to the sector zero pulse, and without reference to polarity except that the "data B" pulses are inverted with respect to the "data A" pulses and delayed therefrom. The outputs of the gates N7 and N8, and of the delay line D2, have been illustrated as above the base line for ground potential and on the base line for a negative potential or the open circuit condition. Operation of the motor has been illustrated as in the backward direction when the heavy line is below the base line and in the forward direction when it is above the base line. Operation of the back stop switch S3 has been illustrated as a raised pulse when the switch is closed, and the "on registration track (+)" level has been illustrated as above the base line when the signal is at ground potential. During periods where particular signals are not of interest because they do not affect operation, they have been shown by dotted lines. The time scale in FIG. 7 has been distorted for convenience, except where operation would be affected. Specifically, the times between appearances of the sector zero and sector pulses have not been shown to scale, nor have the times during which the motor 53 is operated been shown to scale.

With the above conventions in mind, it will be seen in FIG. 7 that when the sector zero pulse first appears, even though the arms are nominally on the registration track the flip-flop F1 will not be set because the "(−) sector" pulse has not yet been applied to the input terminal of the gate N5, so that the input is grounded and the output is held open. When the "sector" pulse appears, the gate N5 will produce a ground level output pulse until the pulse (−)SZP is removed. At the trailing edge of this pulse, the multivibrator OS1, will be triggered, and the flip-flop F1 will be set. The flip-flop F2 cannot be set at this time, however, since the gate N7 is disabled by the gate N6 in response to the (−)SZP pulse applied to its input terminal.

No further action will take place for a revolution of the disks 1, as if the head 9 has not arrived on the registration track by action of the positioner, to set the flip-flop F2 as described above, it will stay off track until operation of the motor 53. When the next sector zero pulse arrives, with the flip-flop F1 in its set state and the flip-flops F2, F3, F4 and F5 in their reset states, the flip-flops F3 and F5 will be set by the sequence of operations next described. With the flip-flop F4 in its reset state, the gate N12 will be enabled, and the pulse (−)SZP present with the "sector (+)" pulse absent will cause the output of the gate N12 to go to ground, and the output of the terminal of the gate N11 to open. The gate N10 will now produce a ground level output, setting the flip-flops F3 and F5. With the flip-flop F3 in its set state, and the flip-flop F5 in its set state, the output of the amplifier DA1 will act as a ground level current sink to cause operation of the motor 53 in a backward direction, rotating the lead screw 46 through the universal joints 49 and 50 to adjust the wedge 37 and thereby move the arms 8 very slowly over the surfaces of the disks 1. Note that the flip-flop F3 cannot be reset with the flip-flop F5 in its set state, as the input terminal to the gate N9 is at ground potential at this time. Thus, even though the flip-flop F2 may be set by the passage of the head 9 over the registration track during the reverse motion of the motor 53, this will be ignored by the apparatus. One reason for this mode of operation is that the apparatus has no information as to the direction in which the head 9 is off track, so that to facilitate the registration procedure, if the head is not initially on track it is always driven sufficiently far off track to be sure in what direction it will be found. A second reason is that by the arrangement shown, except in the occasional case when the heads land exactly on track, registration will always be approached in the same direction with the apparatus loaded in the same direction and any slight overtravel inherent in the operation of the motor 53 will always add the same increment in the same direction. When the heads land on track in the first instance, the motor 53 is not used, but the heads will still be within the very narrow band over which registration is detected.

The motor 53 will continue to move in the reverse direction until the back stop switch S3 is momentarily closed, resetting the flip-flop F5 to reverse the direction of the motor 53, and setting the flip-flop F4.

With the motor 53 moving in a forward direction and the flip-flop F5 in its reset state, the flip-flop F3 may be reset if the flip-flop F2 is set. This will occur at some time during the forward travel of the motor between its extreme reverse position and its extreme forward position. Just before the center of the registration track is reached, the "data A" and "data B" pulses will be regular, as illustrated in FIG. 7. The gate N8 will produce output pulses at ground potential which will be delayed by the delay line D2 such that the input terminal of the gate N7 will be at a negative potential toward the middle or latter portion of the period in which the following "data A" pulse is positive. Thus, the gate N7 will not produce an output ground potential. When the center of the registration track is reached, there will be a series of irregular pulses of short duration and closer in spacing than the previously produced pulses, as illustrated in FIG. 7. Thus, the gate N8 will be enabled by the delay line D2 at a period when the "data A" signal is negative, and one or more pulses will be produced to set the flip-flop F2. Note that during this period even though a plurality of "sector zero" pulses may occur, the flip-flop F5 cannot be set, reversing the direction of the motor, because the flip-flop F4 in its set state disables the gate N10, through the intermediate gates N12 and N11.

When the flip-flop F2 is set, the flip-flops F3 and F4 will be reset. The gate N9 will be enabled by the open potential at the 0 output terminal of the flip-flop F2 and the open potential at the 1 output terminal of the flip-flop F5. The output terminal of the gate N9 will thus be at ground, resetting the flip-flop F3. With the flip-flop F3 reset, its 0 output terminal will be at ground and the flip-flop F4 will be reset. The motor 53 will stop, because the ground potential at the input terminals of the amplifiers DA1 and DA2 will be removed when the flip-flop F3 is reset. With the flip-flop F2 in its set state and the flip-flop F3 in its reset state, and the head on the registration track, the gate N13 will produce the "registered (+)." The switch S1 in FIG. 1 can be returned to its "external address" position at any convenient time thereafter, and normal data exchange can take place.

The next action will take place when the "sector" pulse following the next "sector zero" pulse occurs. At this time, the flip-flops F1 and F2 will be reset by ground potential appearing at the output terminal of the gate N5. Following the "sector zero" pulse, the flip-flop F1 will be reset. Following the accompanying "sector" pulse, the flip-flop F2 will be reset, as the apparatus is still on track. When the switch S1 is moved to its "external address" position, the next occurring external address will cause the positioner to move the arms 8 to another track. When this occurs, the "on registration track (+)" level will be removed from the input of the gate N3, the output of the terminal of this gate will go to ground, and the flip-flops F1 and F2 will be reset. They will remain reset, with the rest of the flip-flops in FIG. 6, until another command is given to reregister, and the registration track address is again applied to the file address register R.

Figure 8:
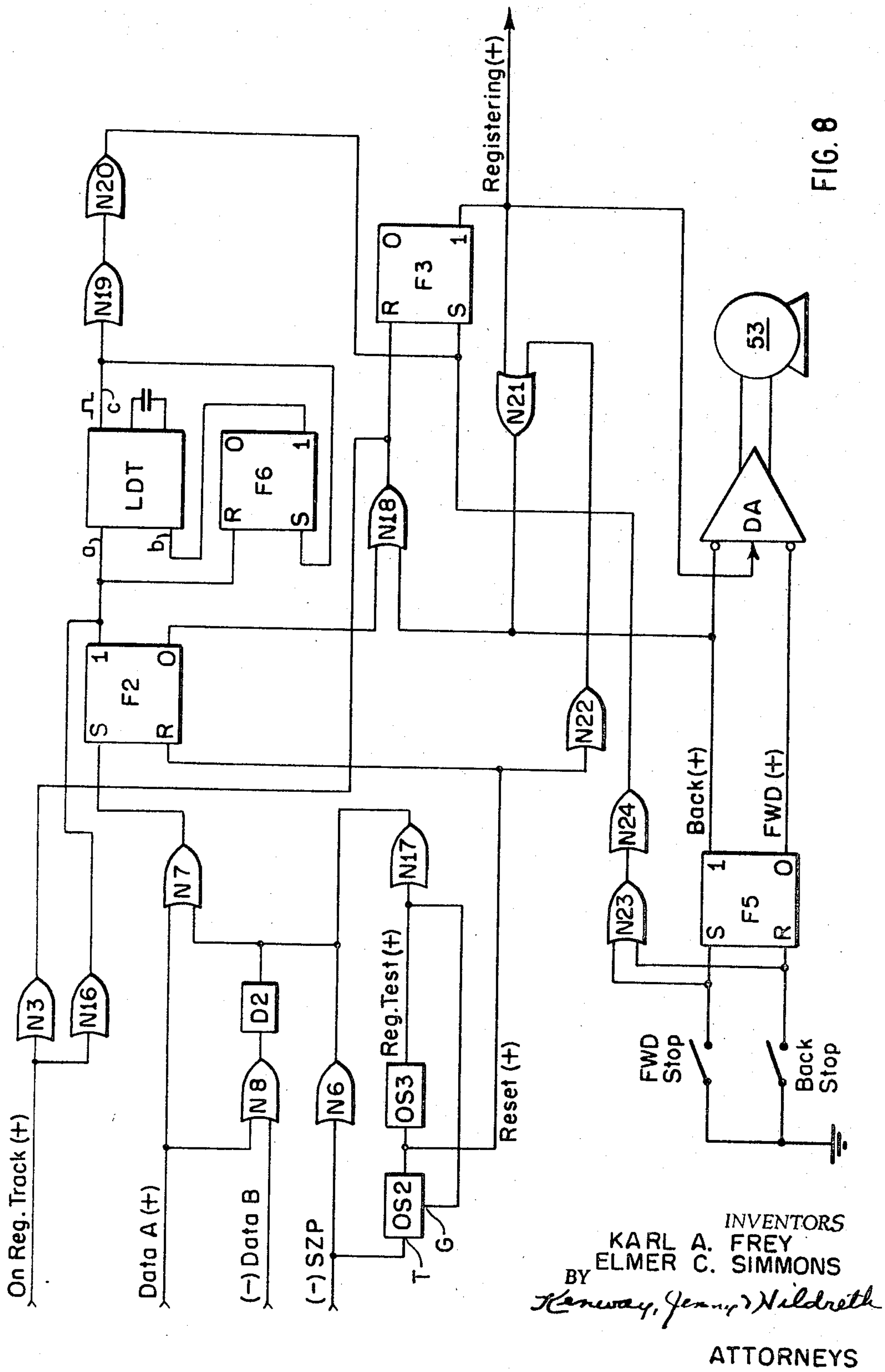
FIG. 8 is a schematic wiring diagram of a modified form of control apparatus for the positioning apparatus of FIGS. 1 and 2.
Figure 10:
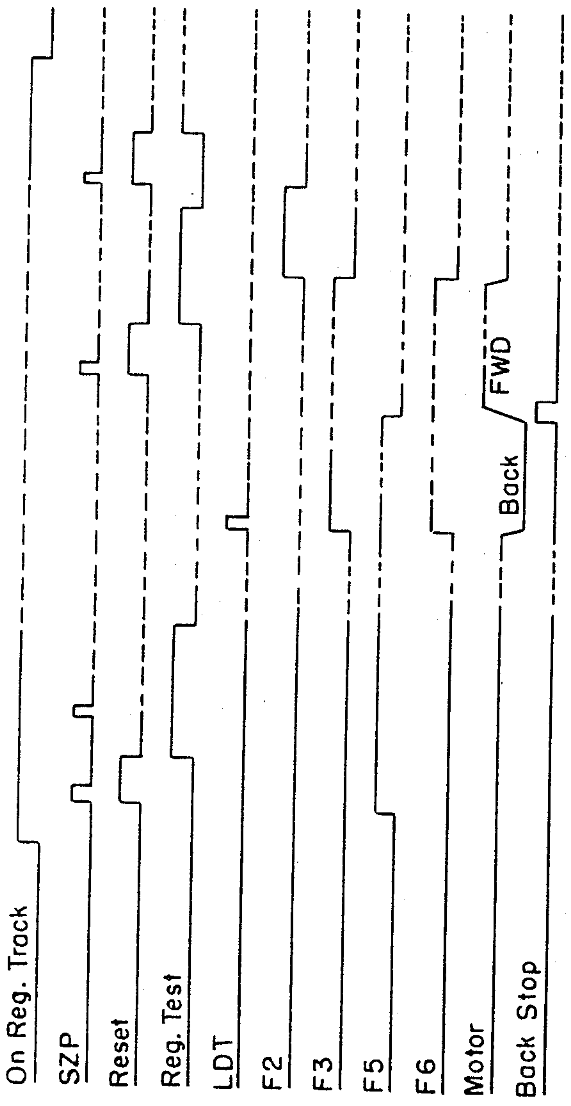
FIG. 10 is a timing diagram illustrating the operation of the apparatus of FIGS. 1–4, 8 and 9.

The apparatus described in connection with FIGS. 1 through 5 is extremely sensitive to nulls in the reproduced signals; so much so that its use may present difficulties when minor eccentricities in the disks are encountered, either because of an irregularity in the hub or for some other reason causing the registration tracks not to be absolutely concentric. Under these conditions, the heads may be so located that registration may be detected at one point on the registration track and not at other points. When this occurs, it is possible for the apparatus to detect registration, and then on the succeeding cycles before the apparatus is removed from the registration track to fail to detect registration because the exact spot does not occur at the proper time, so that a new registration cycle may be started. An eccentricity that might cause this problem can be small enough that it can and should be ignored so far as the operation of the rest of the system is concerned. FIG. 8 shows a modified version of the control apparatus of FIG. 5, suitable for use with the other apparatus shown in FIGS. 1 through 4, by means of which this undesired extra sensitivity may be reduced so that the overall sensitivity is compatible with the remainder of the system. Those elements in FIG. 8 which correspond identically with the same elements in FIG. 5 are given corresponding reference numerals. It will be noted that the manner in which the registration pulse detector flip-flop F2 is set, by means of the gates N8 and N7 and the delay line D2, is the same as that shown and described in connection with FIG. 5. One exception is that an additional inhibiting NOR gate N17 is included, which prevents the flip-flop F2 from being set except during a registration test period established in a manner to be described. In the embodiment of FIG. 8, rather than using the sector pulses, a chain of timing pulses is produced from the sector zero pulse (−)SZP, by means of two conventional one-shot multivibrators OS2 and OS3. The multivibrator OS2 may be of any conventional construction adapted to be triggered to produce a positive pulse of predetermined duration in response to a negative-going trigger transition applied to its input terminal T, when and only when no inhibiting ground potential is applied to its gating terminal G. The multivibrator OS3 may be identical with the multivibrator OS2, except that it does not require a gating terminal. For use with the system described, varying time periods can be used, but in a practical embodiment the pulse time produced by the one-shot multivibrator OS2 was ten milliseconds, and the pulse produced by the multivibrator OS3 was sixty milliseconds. The sixty millisecond pulse inhibits the operation of the one-shot multivibrator OS2 during its duration, so that with disks rotating at 2400 r.p.m., the "registration test (+)" pulse is produced about once every three revolutions of the disk, corresponding to about four occurrences of the (−)SZP pulse. The output of the one-shot multivibrator OS3 is connected to the input terminal of the gate N17, to inhibit the setting of the flip-flop F2 except during the "registration test (+)" pulse. The output of the one-shot multivibrator OS2, labeled "reset (+)," is connected to the reset terminal R of the flip-flop F2. Since the operation of the one-shot multivibrator OS2 is inhibited during the registration test pulse period, it will be seen that the flip-flop F2 cannot be reset during the registration test period.

The "reset (+)" level is also applied to the input terminal of an NOR gate N22. This gate has an output terminal connected to one input terminal of an NOR gate N21, the other input terminal of which is connected to the 1 output terminal of the flip-flop F3. The gate N21 will thus produce an output ground level pulse during the "reset (+)" pulse when the flip-flop F3 is in its reset state. This pulse is used to drive the motor direction control flip-flop F5 to its set state, and for this purpose the output terminal of the gate N21 is connected to the 1 output terminal of the flip-flop F5. By reference to the more detailed showing of the flip-flop F1 in FIG. 5, it will be seen that the application of ground to the 1 output terminal of the flip-flop will cause the flip-flop to assume its set state if ground is not at the same time applied to the reset input terminal R.

The level "on registration track (+)" is applied to the gate N3 as in FIG. 5, and the output terminal of the gate N3 is connected to the reset input terminal R of the flip-flop F3. This flip-flop is accordingly reset when the apparatus is not on the registration track. It can also be reset by an NOR gate N18, which has 1 input terminal connected to the 0 output terminal of the flip-flop F2 and a second input terminal connected to the 1 output terminal of the flip-flop F5. The flip-flop F3 will be reset by the gate N18 when the flip-flop F2 is in its set state and the motor direction control flip-flop F5 is in its reset state.

One circuit for setting the flip-flop F3 extends from the output terminal of the NOR gate N24. This gate has one input terminal connected to the output terminal of an NOR gate N23. The gate N23 has two input terminals, one connected through the "forward stop" switch S2 to ground, and the other connected through the "back stop" switch S3 to ground. Thus, when either switch is closed, flip-flop F3 is set. A second circuit for setting the flip-flop F3 extends from the output terminal of an NOR gate N20. This gate has a single input terminal connected to the output terminal of an NOR gate N19. The NOR gate N19 has a single input terminal connected to the output terminal *c* of a long delay timer LDT. This long delay timer may be of the construction shown in FIG. 9, to be described. Briefly, the circuit is such that if an open or negative potential is applied to both input terminals *a* and *b* for a predetermined time determined by the capacitor C1, a ground level output pulse will be produced. However, if ground is applied to either input terminal *a* or *b* during the predetermined time, no output pulse will be produced. The output terminal *c* of the long delay timer LDT is connected to the set terminal of a conventional flip-flop F6. The reset terminal of the flip-flop F6 is connected to the input terminal *a* of the long delay timer LDT. The 1 output terminal of the flip-flop F6 is connected to the input terminal *b* of the long delay timer LDT. It will be apparent that by this arrangement if the flip-flop F6 is in its reset state and a negative or open potential is applied to the input terminal *a* of the timer LDT, for a sufficient time, a positive output pulse will be produced at the output terminal *c* of the timer LDT that will set the flip-flop F6 and disable the timer LDT until the flip-flop F6 is again reset. A pulse produced by the timer LDT will cause the gate N20 to produce an output ground pulse, setting the flip-flop F3.

The input terminal *a* of the timer LDT is connected to the 1 output terminal of the flip-flop F2 and to the output terminal of the NOR gate N16, the input terminal of which receives the level "on registration track (+)."

The remainder of the apparatus comprises the "forward stop" and "back stop" switches S2 and S3, the motor direction control flip-flop F5, the direction control amplifier DA, and the motor 53, which may be the same as in FIG. 5. Not shown are the manual switches S4 and S5 in FIG. 5, which may also be used with the apparatus of FIG. 8. Also not shown is the gate N13, which in the embodiment of FIG. 8 would have its input terminals connected to the 1 output terminal of the flip-flop F3, the 0 output terminal of the flip-flop F2, and the output terminal of the gate N3.

Figure 9:
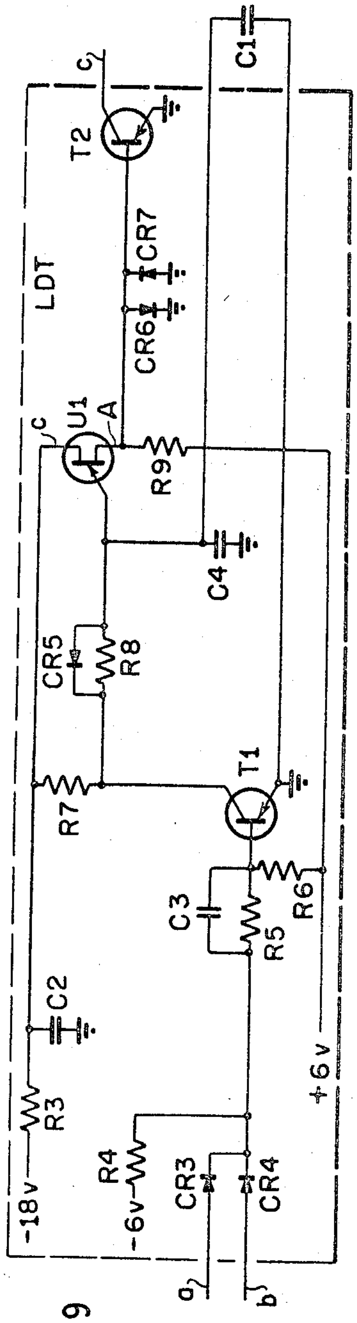
FIG. 9 is a schematic wiring diagram of a timing circuit suitable for use in the apparatus of FIG. 8.

Referring now to FIG. 9, the circuit for the timer LDT is shown in detail. The circuit comprises a first transistor T1 having its emitter grounded and its collector connected to a source of negative potential, here shown as a −18 volt source, through two series resistors R3 and R7. The junction of the resistors R3 and R7 is connected to ground through a capacitor C2. The base of the transistor T1 is biased by a potential divider extending from a suitable source of positive potential, here shown as a 6 volt source, through a resistor R6, a resistor R5 parallelled by a capacitor C3, and a resistor R4 to a source of negative potential, here shown as a −6 volt source. The base is connected to the junction of the resistors R5 and R6, and the input terminals *a* and *b* of the timer are connected through diodes CR3 and CR4 to the junction of the resistors R4 and R5. A unijunction transistor U1 has one base terminal A, serving as the anode, connected to this 6 volt source through the resistor R9. The second base C, serving as the cathode, is connected to the 18 volt source through the resistor R3. The fire gate or emitter of the uniqunction U1 is connected to the collector of the transistor T1 through a resistor R8 parallelled by a diode CR5. The emitter or fire gate of the unijunction U1 is returned to ground through a capacitor C4, in parallel with the external capacitance C1. The anode of the unijunction U1 is connected to ground through two diodes CR6 and CR7, oppositely poled and in parallel. The anode A is also connected to the base of a pnp transistor T2. The transistor T2 has its emitter grounded, and its collector comprises the output terminal *c* of the timer LDT. In practice, all of the components shown within the dotted lines are mounted on a single printed circuit card, with provision for external connection to the capacitor C1 such that a variety of delay times can be provided by an otherwise standard circuit. The operation of the timer LDT is as follows: so long as either of the input terminals *a* and *b* is grounded, the potential of the base of the transistor T1 is held above ground by the drop through the resistor R5. The transistor T1 is thus cut off, and its collector assumes a potential of substantially minus 18 volts as soon as the capacitors C1 and C4 are charged through the resistors R3 and R7 and the diode CR5 conducting current in a forward direction. The fire gate of the unijunction is thus held at substantially the same potential as its cathode C. As is well known in the art, the operation of the unijunction is such that when the voltage between the fire gate and the anode reaches a predetermined percentage of the voltage between the cathode and the anode, the unijunction will conduct. In this case, if the potential of the fire gate falls to approximately 63 percent of the voltage between the bases, the unijunction will conduct. With the transistor T1 cut off, the unijunction U1 will be cut off, and the potential at its anode will be slightly positive because of the forward drop through the diode CR6. The transistor T2 will then be cut off, and the output terminal *c*, connected to the collector of the transistor T2, will be at an open potential. Assume now that both of the terminals *a* and *b* are in open or negative potential. Because of the ratio of the resistors R4, R5 and R6, typical values of which will be given below, the base of the transistor T1 will now be slightly negative with respect to the emitter, and the transistor will conduct heavily. The capacitors C4 and C1 will now discharge through the resistor R8, the diode CR5 being blocked to conduction in this direction. At a time determined by the values of the resistor R8 and the capacitors C1 and C4, the potential of the fire gate of the unijunction will fall to the point at which the unijunction will conduct, causing its anode to go slightly negative by the amount of the forward drop through the diode CR7, causing the transistor T2 to conduct heavily, and presenting an output current sink at ground potential at the output terminal *c*. It will be seen that if ground is applied to either input terminal *a* or input terminal *b* of the timer LDT, the transistor T1 will be cut off and the capacitors C1 and C4 will be very rapidly recharged through the diode CR5 bypassing the timing resistor R8.

Typical values for the components of the circuit shown in FIG. 9 are as follows:

R3—10 ohms, ½ watt, 5%
R4—2.43K
R5—2.21K
R6—14.0K
R7—1K
R8—221K
R9—562 ohms
C2—10 microfarads, 25 volts
C3—560 micromicrofarads
C4—1 microfarad
C1—3 microfarads The diodes were all type 1N276, the transistor T1 was a type T51648, the unijunction U1 was a type 2N491, and the transistor T2 was a type 2N404. With these components, the timer LDT would produce a positive pulse after 1 second.

Having described the construction of this embodiment of the apparatus of our invention, its operation will next be described. Referring to FIGS. 8 and 9, assume first that the head is off the registration track and that the output of the gates N3 and N16 are correspondingly at ground potential. Further assume that all flip-flops are in their reset state. When the "on registration track (+)" level appears, the output of the gates N3 and N16 will open, and the timer LDT will begin its timing period to produce an output pulse if one of its terminals *a* and *b* is not grounded before the end of the period.

When the next occurring sector zero pulse (—)SZP occurs, the one-shot OS2 will be triggered, producing the "reset (+)" pulse to reset the flip-flop F2. Since the flip-flop F2 is already assumed to be in its reset state, this will not produce any change in its state. At the same time, the gate N22 will produce an open potential, and with the flip-flop F3 in its reset state, the flip-flop F5 will be forced to its set state. Following the "reset (+)" pulse, the "registration test (+)" pulse will be produced, and will endure for 60 milliseconds. During this time, the gate N17 will produce an open output potential, and the one-shot OS2 will be gated. During the "registration test (+)" pulse, if the heads happen to land on track, the flip-flop F2 will be set. This action will disable the timer LDT, and with the flip-flop F2 in its set state and the flip-flop F3 in its reset state, registration will be indicated and no further action will be required. Since the flip-flop F2 cannot be reset for about three revolutions of the disk, this action will prevent an immediate re-registration cycle if the apparatus happened to detect an eccentricity on the track.

If registration is not detected within this time, following the "registration test (+)" pulse, and at the next SZP pulse, the one-shot OS2 will be triggered again, the reset (+) pulse will be produced to make sure that the flip-flop F2 is reset, and operation will continue until the time the LDT produces its output pulse, setting the flip-flop F6 and the flip-flop F3. With the flip-flop F3 set, the motor will begin to run in a backward direction, until the back stop S3 is encountered. When this occurs, the flip-flop F5 will be reset, and the motor will begin its forward stroke. At some time during this forward stroke, registration tracks will be encountered, and with the head substantially on center during a "registration test (+)" pulse, the flip-flop F2 will be set. This action will disable the long delay timer LDT and reset the flip-flop F6. With the flip-flop F5 in its reset state, the gate N18 will then reset the flip-flop F3. The apparatus will thus be restored to its initial condition with the registration condition detected, and the heads may then be moved to any other track.

While we have described the apparatus of our invention with respect to the details of specific embodiments thereof, many changes and variations will be suggested to those skilled in the art upon reading our description, and such can obviously be made without departing from the scope of our invention.

Having thus described our invention, what we claim is:

1. In a random access disk file, in combination, a mandrel, means for rotating said mandrel at constant speed, a set of magnetic recording disks removably mounted on said mandrel for rotation therewith, a set of arms adjustably mounted for movement over a predetermined range of positions adjacent said disks, transducer heads mounted on said arms, one adjacent the surface of each disk, digital positioning means connected to said arms for setting said heads adjacent any of a set of positions corresponding to recording track addresses on said disks, a predetermined surface of one of said disks having at a predetermined one of said addresses adjacent periodic signals recorded at different frequencies, said positioning means including adjustable means for off-setting the set of positions to which said heads may be set over a predetermined range, means for actuating said positioning means to set said heads to said predetermined address, means controlled by the head adjacent said predetermined surface for producing an amplified and limited signal corresponding to both of said periodic signals in proportions dependent on the exact position of the heads, and means controlled by said amplified and limited signal for adjusting said adjustable means until said amplified and limited signal changes in frequency.

2. In combination with an electromagnetic transducer for reproducing electromagnetically recorded signals, apparatus for positioning said transducer with respect to a set of recording tracks on a magnetic recording surface, means for moving said surface at constant speed with respect to the transducer in the sense of alignment of the tracks to cause the transducer to reproduce signals recorded on any of said tracks adjacent the transducer, digital positioning means responsive to an applied track address code for setting said transducer to any of a set of positions each approximately adjacent a different one of said tracks, said positions, being spaced apart in correspondence with the spacing of said tracks, said positioning means being adjustable to offset said set of positions over a predetermined range to permit precise registration of said transducer with said tracks, a selected one of said tracks having recorded on either side of its center two closely spaced periodic signals at different frequency, whereby when said transducer is approximately set adjacent said selected track it reproduces both signals in proportions dependent on its position, means for applying a track address code corresponding to said selected track to said positioning means to set said transducer approximately adjacent said selected track, means for amplifying and limiting the signals reproduced by said transducer for producing an output signal of rectangular waveform, and registering means controlled by said amplifying and limiting means for adjusting said positioning means until said output signal periodically changes in frequency.

3. The apparatus of claim 2, in which said registering means comprises a reversible servomotor operatively connected to adjust said positioning means, time delay means responsive to said output signal to produce a corresponding signal delayed in phase by less than one-half period of the output signal when said transducer is influenced more by one of said recorded signals than by the other, gating means controlled by said output signal and said delayed signal for producing a sampling pulse each time said signals are in a predetermined phase relation, means controlled by said output signal and said sampling pulses for producing an output pulse each time the sampling pulse and the output signal are not in the phase relation existing when said transducer is influenced more by one recorded signal than by the other, and control means for operating said servomotor to adjust said adjustable means until an output pulse is produced.

4. The apparatus of claim 2, in which said registering means comprises a reversible servomotor connected to adjust said positiong means over a predetermined range, first, second, third and fourth bistable registers, means for setting said first and second registers to a first state when said transducer is approximately adjacent said selected track, means controlled by said amplifying and limiting means for setting said first register to its second state when said output signal changes in frequency, means controlled by the position of said recording surface relative to said transducer in said sense of alignment for producing a set of control pulses each time the surface moves a predetermined distance, means controlled by the first set of control pulses produced when said transducer has been set adjacent said selected track for setting said second register to its second state, means controlled by the next set of control pulses produced, said first register in its first state and said second register in its second state for setting said third and fourth registers to their second states, means controlled by said third register in its second state and said fourth register for operating said servomotor in a first or a second sense according as said fourth register is in its first or its second state, respectively, limit switch means actuated by said servomotor at a predetermined extreme of operation in said second sense for setting said fourth register to its first state, and means controlled by said first register in its second state and said fourth register in its first state for setting said third register to its first state.

5. The apparatus of claim 3, in which said means for setting said first register to its second state comprises time delay means responsive to said output signal to produce a corresponding signal delayed in phase by less than one-half the period of the output signal when said transducer is not equally influenced by said recorded signals, gating means controlled by said output signal and said delayed signal for producing a sampling pulse each time said signals are in a predetermined phase relation, and means controlled by said output signal and said sampling pulses for setting said first register to its second state each time the sampling pulse and the output signal are not in the phase relation existing when said transducer is not equally influenced by said recorded signals.

6. In combination with a recording disk, means for rotating said disk at constant speed, an arm movable over a range of positions adjacent said disk, and a transducer head mounted on said arm for cooperation with said disk, digital positioning means having an output element settable to any of a set of positions, means adjustable connecting said output element to said arm to cause said head to assume positions adjacent said disk corresponding to the positions of said output element and adjustable into registry with corresponding recording tracks on said disk, a pair of periodic signals of different frequency recorded on said disk in closely spaced relation on either side of the center line of a selected recording track on said disk, means for setting said digital positioning means to a position corresponding to said selected track to place said head approximately adjacent said selected track, amplifying and limiting means controlled by said head when said head is approximately adjacent said selected track for producing an output signal of rectangular waveform determined by both recorded signals in proportions dependent on the exact position of said head relative to said selected track, and registration means controlled by said amplifying and limiting means for adjusting said adjustable connecting means until said output signal changes in frequency.

7. The apparatus of claim 6, in which said registration means comprises a reversible servomotor operatively connected to said adjustable connecting means, time delay means responsive to said output signal to produce a corresponding signal delayed in phase by less than one-half period of the output signal when said head is influenced more by one of said recorded signals than by the other, gating means controlled by said output signal and said delayed signal for producing a sampling pulse each time said signals are in a predetermined phase relation, means controlled by said output signal and said sampling pulses for producing an output pulse each time the sampling pulse and the output signal are not in the phase relation existing when said transducer is influenced more by one recorded signal than by the other, and control means for operating said servomotor to adjust said connecting means until an output pulse is produced.

8. The apparatus of claim 6, in which said registering means comprises a reversible servomotor connected to said adjustable connecting means over a predetermined range, first, second, third and fourth bistable registers, means for setting said first and second registers to a first state when said head is approximately adjacent said selected track, means controlled by said amplifying and limiting means for setting said first register to its second state when said output signal changes in frequency, means controlled by the rotated position of said disk for producing a set of control pulses each time the disk rotates through a predetermined angle, means controlled by the first set of control pulses produced when said head has been set adjacent said selected track for setting said second register to its second state, means controlled by the next set of control pulses produced, said first register in it first state, and said second register in its second state for setting said third and fourth registers to their second states, means controlled by third register in its second state and said fourth register for operating said servomotor in a first or a second sense according as said fourth register is in its first or its second state, respectively, limit switch means actuated by said servomotor at a predetermined extreme of operation in said second sense for setting said fourth register to its first state, and means controlled by said first register in its second state and said fourth register in its first state for setting said third register to its first state.

9. The apparatus of claim 8, in which said means for setting said first register to its second state comprises time delay means responsive to said output signal to produce a corresponding signal delayed in phase by less than one-half the period of the output signal when said head is not equaly influenced by said recorded signals, gating means controlled by said output signal and said delayed signal for producing a sampling pulse each time said signals are in a predetermined phase relation, and means controlled by said output signal and said sampling pulses for setting said first register to its second state each time the sampling pulse and the output signal are not in the phase relation existing when said transducer is not equally influence by said recorded signals.

10. The apparatus of claim 4, in which said registering means comprises a reversible servomotor connected to adjust said positioning means over a predetermined range, first, second and third bistable registers, means controlled by the position of said recording surface relative to said transducer in said sense of alignment for producing a control pulse each time the surface moves a predetermined distance, pulse generating means having a first and a second state and responding in its first state to each control pulse to produce a reset pulse followed by a test period pulse having a duration spanning a plurality of said control pulses, means controlled by said test period pulses for setting said pulse generating means to its second state during each test period pulse, means controlled by each reset pulse for setting said first register to a first state, means controlled by said amplifying and limiting means and said pulse generating means for setting said first register to its second state when said output signal changes in frequency during a test period pulse, means for setting said second register to a first state when said transducer is not approximately adjacent said selected track, time delay means controlled by said first register when said transducer is approximately adjacent said selected track for producing an output pulse after said first register has been in its first state for a predetermined time, means controlled by said output pulse for setting said second register to its second state, means controlled by said reset pulse and said second register in its first state for setting said third register to a first state and said third register for operating said servomotor in a first or a second sense according as said third register is in its first or its second state, respectively, limit switch means actuated by said servomotor at a predetermined extreme of operation in said second sense for setting said fourth register to its first state, and means controlled by said pulse generating means, said first register in its second state and said third register in its first state for setting said second register to its first state.

11. The apparatus of claim 10, in which said means for setting said first register to its second state comprises time delay means responsive to said output signal to produce a corresponding signal delayed in phase by less than one-half the period of the output signal when said transducer is not equally influenced by said recorded signals, gating means controlled by said output signal and said delayed signal for producing a sampling pulse each time said signals are in a predetermined phase relation, and means controlled by said output signal and said sampling pulses for setting said first register to its second state during a test period pulse each time the sampling pulse and the output signal are not in the phase relation existing when said transducer is not equally influenced by said recorded signals.

12. Apparatus for accurately positioning a transducer with respect to a moving magnetic recording surface, comprising, in combination:

a pair of magnetic reference signal tracks recorded adjacent one another on said surface in the direction of movement thereof, said tracks having different frequency characteristics;

primary positioning means for positioning said transducer in registration with selected portions of said surface;

vernier positioning means for adjusting the position of said transducer with respect to said primary positioning means;

means for operating said primary positioning means to locate said transducer over said reference signal tracks;

means responsive to the completion of the latter mentioned operation for operating said vernier positioning means to scan said transducer across said reference signal tracks in a predetermined direction; and control means responsive to a change in the frequency characteristics of the signal output of said transducer to arrest said scanning operation and to render said vernier positioning means inoperable whereby said transducer and said primary positioning means are held in a fixed position relative to one another.

References Cited

UNITED STATES PATENTS

| | | | |
|---|---|---|---|
| 3,172,082 | 3/1965 | Dirks | 340—174.1 |
| 3,263,031 | 7/1966 | Welsh | 340—174.1 |
| 3,362,021 | 1/1968 | Ma et al. | 340—174.1 |

BERNARD KONICK, *Primary Examiner.*

B. L. HALEY, *Assistant Examiner.*